US012133520B2

United States Patent
Marshall, III

(10) Patent No.: US 12,133,520 B2
(45) Date of Patent: Nov. 5, 2024

(54) RODENT PROTECTION INSERT FOR A STRUCTURE OPENING

(71) Applicant: Your Crawl Space, Inc., Awendaw, SC (US)

(72) Inventor: Henry Bennie Marshall, III, McClellanville, SC (US)

(73) Assignee: Your Crawl Space Inc., Awendaw, SC (US)

( * ) Notice: Subject to any disclaimer, the term of this patent is extended or adjusted under 35 U.S.C. 154(b) by 156 days.

(21) Appl. No.: 18/049,415

(22) Filed: Oct. 25, 2022

(65) Prior Publication Data

US 2023/0136311 A1 May 4, 2023

Related U.S. Application Data

(60) Provisional application No. 63/273,603, filed on Oct. 29, 2021.

(51) Int. Cl.
  *E04B 1/72* (2006.01)
  *A01M 29/30* (2011.01)
  *F24F 13/08* (2006.01)

(52) U.S. Cl.
  CPC ............ *A01M 29/30* (2013.01); *E04B 1/72* (2013.01); *F24F 13/082* (2013.01)

(58) Field of Classification Search
  CPC .. E04B 1/72; E04B 1/80; E04C 2/292; A01M 29/30; A01M 29/34; F24F 13/082
  (Continued)

(56) References Cited

U.S. PATENT DOCUMENTS 3,740,934 A * 6/1973 Shuler .................. B01D 46/10
  55/504
4,520,715 A * 6/1985 Coomes .................. F24F 13/00
  454/367
(Continued)

FOREIGN PATENT DOCUMENTS

GB    2257246 A    1/1993
JP    9217958 A    8/1997
(Continued)

OTHER PUBLICATIONS

Print out from URL https://crawlspacedepot.com/ventblockplus-each/ (Access date Oct. 25, 2021).
(Continued)

*Primary Examiner* — Paola Agudelo
(74) *Attorney, Agent, or Firm* — Kim and Lahey Law Firm, LLC; Seann P. Lahey

(57) ABSTRACT

A rodent protection insert for a structure opening including a flexible polymer foam sheet having a protective mesh sheet carried on a front side which moves independently of the foam sheet. A securing member maintains a mechanical connection between the flexible polymer foam sheet and the mesh sheet. An airflow port is disposed in the flexible polymer foam sheet that includes a removable plug for controlling airflow through the airflow port. A perimeter edge of the flexible polymer foam sheet compresses against and conforms to interior wall surfaces within a structure opening when mounted to form an airtight seal against the interior wall surfaces and hold the foam sheet in place. The protective mesh sheet engages the interior wall surfaces when the flexible polymer foam sheet is compressed in the structure opening so that the protective mesh sheet stabilizes and supports the flexible polymer foam sheet within the structure opening.

18 Claims, 7 Drawing Sheets

(58) Field of Classification Search
USPC ........................................................ 52/309.6
See application file for complete search history.

(56) References Cited

U.S. PATENT DOCUMENTS

| | | | |
|---|---|---|---|
| 4,631,077 A * | 12/1986 | Spicer | B01D 46/2411 |
| | | | 55/DIG. 13 |
| 4,829,882 A | 5/1989 | Jackson | |
| 4,964,438 A * | 10/1990 | Welty | F24F 13/0263 |
| | | | 126/319 |
| 5,092,520 A | 3/1992 | Lestage | |
| 5,253,804 A | 10/1993 | Sarazen et al. | |
| 5,383,816 A | 1/1995 | Marcello | |
| 5,460,572 A * | 10/1995 | Waltz | E04B 1/7076 |
| | | | 52/302.1 |
| 5,482,507 A | 1/1996 | Priest | |
| 5,564,976 A | 10/1996 | Muller et al. | |
| 5,704,172 A * | 1/1998 | Gougeon | A01M 1/245 |
| | | | 52/169.5 |
| D411,874 S | 7/1999 | Ko | |
| 5,944,445 A | 8/1999 | Montgomery | |
| 6,149,514 A | 11/2000 | Maury | |
| 6,227,962 B1 * | 5/2001 | Orendorff | F24F 13/28 |
| | | | 454/289 |
| D446,317 S | 8/2001 | Jackson et al. | |
| D448,489 S | 9/2001 | Jackson et al. | |
| 6,468,054 B1 | 10/2002 | Anthony et al. | |
| 7,022,011 B1 * | 4/2006 | Rickman | F24F 13/0218 |
| | | | 454/903 |
| 7,097,557 B2 | 8/2006 | Kutschman | |
| 7,270,498 B1 | 9/2007 | Albanese | |
| D580,043 S | 11/2008 | Sykes | |
| D583,042 S | 12/2008 | Jackson et al. | |
| D593,193 S | 5/2009 | Jackson et al. | |
| 7,581,361 B1 * | 9/2009 | Murkland | E04B 1/72 |
| | | | 52/21 |
| 7,600,944 B1 | 10/2009 | Keating | |
| D607,098 S | 12/2009 | Sykes | |
| 7,780,509 B1 | 8/2010 | Hoaks | |
| 7,926,539 B1 | 4/2011 | Hurst et al. | |
| D654,162 S | 2/2012 | Sykes | |
| 8,499,497 B1 * | 8/2013 | Hugueley | F24F 13/082 |
| | | | 49/463 |
| 8,511,938 B1 | 8/2013 | Payne et al. | |
| 9,353,569 B1 | 5/2016 | Anderson, Jr. et al. | |
| 9,376,803 B1 | 6/2016 | Anderson, Jr. et al. | |
| 9,758,982 B2 | 9/2017 | Anderson, Jr. et al. | |
| D856,505 S | 8/2019 | Sykes | |
| D875,233 S | 2/2020 | Sykes | |
| 10,584,510 B2 | 3/2020 | Anderson, Jr. et al. | |
| 11,603,657 B1 * | 3/2023 | Tesh | E04B 1/80 |
| 2002/0021941 A1 | 2/2002 | Montgomery et al. | |
| 2003/0082008 A1 | 5/2003 | Sprengle, Sr. et al. | |
| 2005/0186900 A1 | 8/2005 | Janseky | |
| 2008/0113606 A1 | 5/2008 | Janesky | |
| 2008/0182503 A1 | 7/2008 | Yurcak | |
| 2008/0236062 A1 | 10/2008 | Bergaglio | |
| 2009/0148236 A1 | 6/2009 | Achen | |
| 2009/0158675 A1 * | 6/2009 | Sourlis | E04B 1/72 |
| | | | 52/169.5 |
| 2009/0191807 A1 | 7/2009 | Wood | |
| 2009/0239462 A1 | 9/2009 | Hendricks | |
| 2010/0086358 A1 * | 4/2010 | Haryslak | E02D 31/02 |
| | | | 405/87 |
| 2012/0174501 A1 | 7/2012 | Malitsky et al. | |
| 2012/0260593 A1 * | 10/2012 | Gower, Sr. | E04B 1/7076 |
| | | | 52/302.1 |
| 2013/0125481 A1 | 5/2013 | Marshall | |
| 2013/0279986 A1 | 10/2013 | Payne et al. | |
| 2015/0300026 A1 * | 10/2015 | Eisenkrein | E04F 13/045 |
| | | | 52/741.1 |
| 2016/0138267 A1 * | 5/2016 | Ettinger | C08G 18/6662 |
| | | | 521/110 |
| 2016/0298380 A1 * | 10/2016 | Anderson, Jr. | E04B 1/7076 |
| 2016/0298381 A1 | 10/2016 | Anderson, Jr. et al. | |
| 2019/0203461 A1 * | 7/2019 | Anderson | E06B 9/02 |
| 2020/0060227 A1 * | 2/2020 | Bofill | A01M 29/34 |
| 2021/0017759 A1 | 1/2021 | Sykes | |
| 2022/0195720 A1 | 6/2022 | Marshall | |

FOREIGN PATENT DOCUMENTS

| | | |
|---|---|---|
| JP | 2004156841 A | 6/2004 |
| KR | 1020100079709 A | 7/2010 |

OTHER PUBLICATIONS

Crawlspace Depot Seal Crawlspace Vents Without a Lot of Time and Mess (spec sheet, 2021).

* cited by examiner

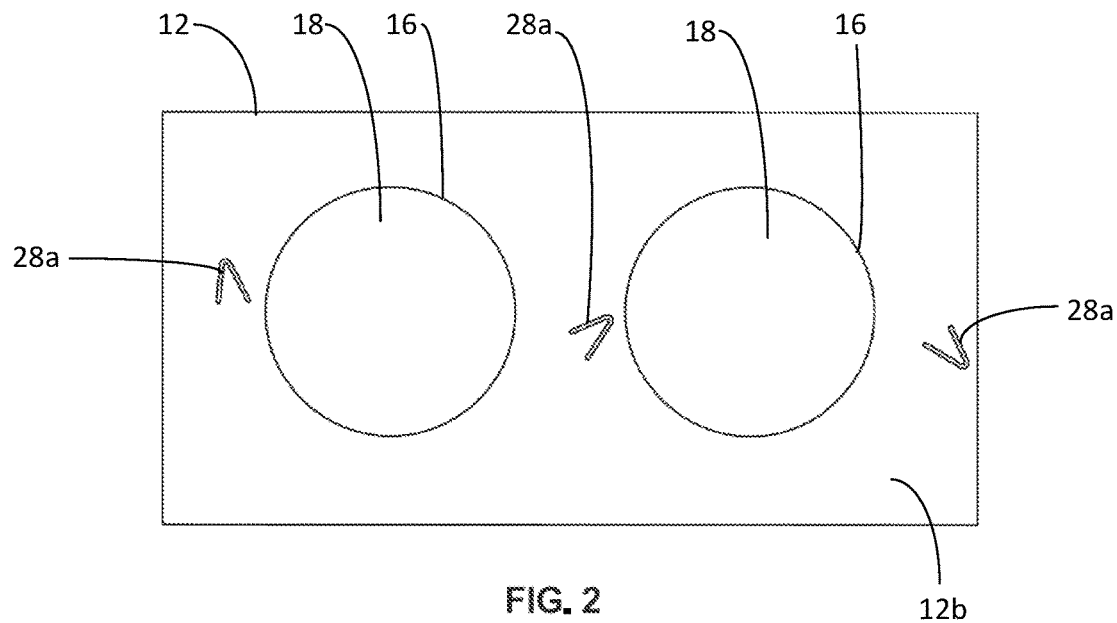
FIG. 2
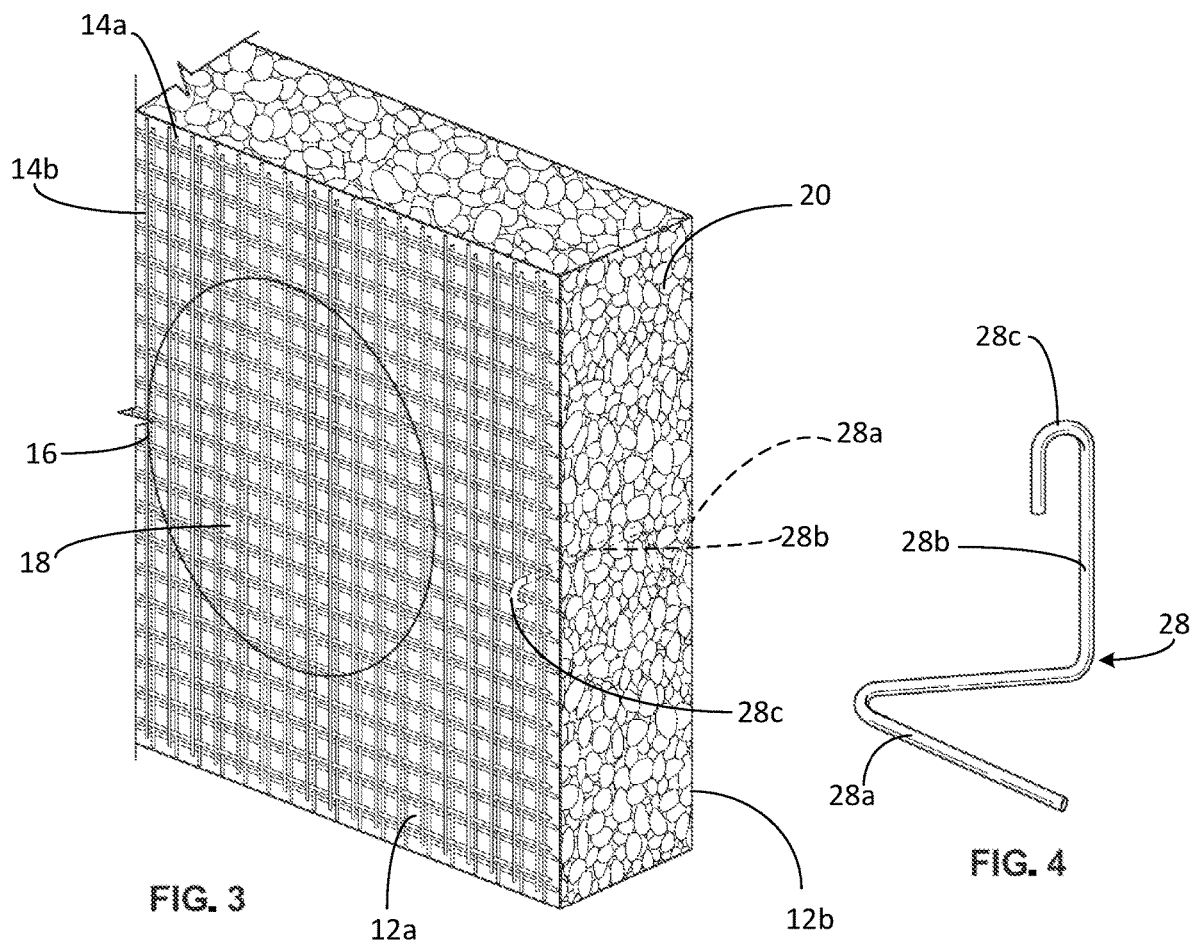
FIG. 3
FIG. 4

RODENT PROTECTION INSERT FOR A STRUCTURE OPENING

BACKGROUND OF THE INVENTION

1) Field of the Invention

The present invention relates to inserts for use in structure opening such as a vent opening in a crawl space or basement, and more particularly, to an insert that conforms to the structure opening walls to hold the insert in place without mechanical fasteners, forms an airtight seal to control airflow through the structure opening, is adaptable to provide a combination of sealing, insulation and ventilation as needed for a given space, and provides protection against rodent and insect intrusion and damage.

2) Description of Related Art

Crawl spaces and basements may often be equipped with various vent openings in the walls to allow for airflow to control moisture levels and temperatures. These vent openings need to be covered to prevent rodents, debris, and water from entering into the crawl space or basement, while also allowing for airflow when necessary, or to provide insulation and resist airflow. It is also common to install various types of wire mesh behind vent covers to further protect against rodent intrusion. Typically, the vent covers and wire mesh are mechanically fastened to the walls of the opening to secure them in place, which requires a significant amount of installation work. Originally installed vent covers are usually held in place with mortar, making replacement a major project. Over time, these vent covers, or wire mesh can break, corrode, or otherwise fail and require replacement at significant time and expense.

An issue with installing inserts, such as a vent cover, into structure openings involves imperfect openings resulting from excess mortar that interferes with fitment, construction variances in size and shape, human error, and various other unexpected situations such as sealing an opening that was the result of damage or other unintended gaps for which no insert was designed or intended to fill.

Typically, a vent cover is attached to a foundation wall using fasteners such as screws, mortar and other such permanent mounted options. This requires various tools to level and shim the cover unit, as well as to drill and insert the screws into concrete, mortar and brick. The vent covers are typically constructed of a rigid material that leaves gaps between the wall and vent covers that air can pass through, which adversely impacts performance and allows debris, water, bugs and even rodents to enter the crawl space. While such gaps can be filed with caulk and the like, the installation is more complex and less accommodating for imperfect openings. Existing vent covers are not designed to form airtight seals without extensive additional installation steps to seal the rodent protection insert to the crawl space or basement walls. Thus, as a result, when an original vent cover fails, the first option is to install wire mesh behind the vent cover with mechanical fasteners simply to prevent rodent intrusion, while leaving the original vent cover in place.

Vent covers are known in the art that can include insulation to assist with temperature control around the vent opening. However, these insulation materials are typically rigid and brittle types of polymer foams that are easily broken or crack and will not flex and conform to a space for mounting a cover unit in a vent opening. These insulation foams are intended purely as an insulation layer and not a mounting element of any type.

Some rodent protection inserts have tried to use a flexible foam sheet with wire mess on the outside surface. The wire mesh is attached using a spray on adhesive and as the foam sheet flexes during installation, the wire mesh easily separates from the foam sheet and becomes ineffective. These covers are intended only to seal a vent closed and do not provide any ventilation option.

Accordingly, it is an object of the present invention to provide a rodent protection insert for use in a structure opening such as a crawl space or basement vent opening that includes a flexible polymer foam sheet carrying a mesh protective layer for mounting in a structure opening in a quick and simple installation without the need for mechanical fasteners or removing the existing vent cover or wire mesh.

It is a further object of the present invention to provide a rodent protection insert having a flexible polymer foam sheet carrying a mesh protective layer wherein the flexible polymer foam sheet compresses and conforms to the shape of the vent opening walls to hold the rodent protection insert in place and form an airtight seal.

It is a further object of the present invention to provide a rodent protection insert having a flexible polymer foam sheet carrying a mesh protective layer wherein the mesh protective layer is mechanically attached but movably carried on the polymer sheet to avoid complete separation and allow for adjustments when mounting in the structure opening.

It is a further object of the present invention to provide a rodent protection insert for a structure opening such as crawl space or basement vent opening that is adaptable to both seal and ventilate the associated space.

SUMMARY OF THE INVENTION

The above objectives are accomplished according to the present invention by providing a rodent protection insert for use in structure openings such as vent openings in crawl spaces, basements, foundation walls and the like, the rodent protection insert comprising a flexible polymer foam sheet; at least one airflow port disposed in said flexible polymer foam sheet; a removable plug disposed in at least one said airflow port for controlling airflow through said airflow port; at least one protective mesh sheet movably carried on a front side of said flexible polymer foam sheet; at least one securing member having a first portion anchored in said foam sheet and a second portion engaging said at least one protective mesh sheet, wherein said second portion loops over at least one wire of said at least one protective mesh sheet such that said at least one protective mesh sheet is movable in both horizontal and vertical directions; whereby said at least one protective mesh sheet is mechanically connected to and adjustable relative to said front side of said flexible polymer foam sheet.

In a further advantageous embodiment, said at least one protective mesh sheet includes a first protective mesh sheet adjacent said front side of said flexible polymer foam sheet, and a second protective mesh sheet carried on said first protective mesh sheet so that said first protective mesh sheet is disposed between said front side of said flexible polymer foam sheet and said second protective mesh sheet.

In a further advantageous embodiment, said first and second protective mesh sheets have a staggered layered arrangement so that vertical and horizontal strands of the protective mesh sheet do not align.

In a further advantageous embodiment, at least one of said first and second protective mesh sheets comprises a metal wire mesh.

In a further advantageous embodiment, an insect screen is carried on a front side of said flexible polymer foam sheet covering over said at least one airflow port, wherein said insect screen is disposed between said at least one protective mesh sheet and said flexible polymer foam sheet.

In a further advantageous embodiment, said flexible polymer foam sheet is selected from the group consisting of polyethylene, polypropylene, polystyrene, polyvinyl chloride (PVC), poly(methyl methacrylate) (PMMA), epoxy resin, phenolic resin, polyester, polyurethane, and combinations thereof.

In a further advantageous embodiment, said flexible polymer foam sheet comprises a polyethylene foam having a closed cell structure on a front surface and a rear surface, and an open cell structure around a perimeter surface.

In a further advantageous embodiment, an insulation backing layer is carried on a rear side of said flexible polymer foam sheet.

In a further advantageous embodiment, said first portion of said at least one securing member includes a generally V-shaped end section extending parallel along a rear surface of said flexible polymer foam sheet and a shaft extending through said flexible polymer foam sheet to a front surface.

In a further advantageous embodiment, said second portion of said at least one securing member includes a hook looping over at least one wire of said at least one protective mesh sheet.

In a further advantageous embodiment, said removable plug includes a connecting member securing said removable plug to said flexible polymer foam sheet, wherein said connecting member is integral with said flexible polymer foam sheet and said removable plug, and wherein said connecting member is severed to allow said plug to be removed from said airflow port.

In a further advantageous embodiment, said flexible polymer foam sheet is compressed against said removable plug in said airflow port to form an airtight seal between said removable plug and said flexible polymer foam sheet.

In a further advantageous embodiment, said flexible polymer foam sheet includes a compressible perimeter surface that compresses against and conforms to interior wall surfaces within a structure opening when mounted to hold said foam sheet in position and form an airtight seal against said interior wall surfaces.

In a further advantageous embodiment, said at least one protective mesh sheet is smaller than said front side of said flexible polymer foam sheet, and wherein said protective mesh sheet engages said interior wall surfaces when said perimeter surface of said flexible polymer foam sheet is compressed in said structure opening so that said protective mesh sheet stabilizes and supports said flexible polymer foam sheet within said structure opening.

The above objectives are further accomplished according to the present invention by providing a rodent protection insert for a structure opening comprising a flexible polymer foam sheet; a protective mesh sheet carried on a front side of said flexible polymer foam sheet which moves independently on said front side of said flexible polymer foam sheet; at least one securing member maintaining a mechanical connection between said flexible polymer foam sheet and said protective mesh sheet; an airflow port disposed in said flexible polymer foam sheet; a removable plug disposed in said airflow port for controlling airflow through said airflow port; wherein a perimeter edge of said flexible polymer foam sheet compresses against and conforms to interior wall surfaces within a structure opening when mounted to form an airtight seal against said interior wall surfaces and hold said foam sheet in place; and, wherein said protective mesh sheet engages said interior wall surfaces when said flexible polymer foam sheet is compressed in said structure opening so that said protective mesh sheet stabilizes and supports said flexible polymer foam sheet within said structure opening.

In a further advantageous embodiment, an insect screen is carried on said front side of said flexible polymer foam sheet covering over said airflow port, wherein said insect screen is disposed between said protective mesh sheet and said flexible polymer foam sheet.

In a further advantageous embodiment, said at least one securing member includes a first portion having a generally V-shaped end section extending parallel along a rear surface of said flexible polymer foam sheet and a shaft extending through said flexible polymer foam sheet to a front surface.

In a further advantageous embodiment, said at least one securing member includes a second portion having a hook looping over at least one wire of said protective mesh sheet so that said protective mesh sheet is movable relative to said front side of said flexible polymer foam sheet.

The above objectives are further accomplished according to the present invention by providing a rodent protection insert for a structure opening comprising a flexible polymer foam sheet; a protective mesh sheet movably carried on a front side of said flexible polymer foam sheet; at least one securing member maintaining a mechanical connection between said flexible polymer foam sheet and said protective mesh sheet; and, wherein a perimeter edge of said flexible polymer foam sheet compresses against and conforms to interior wall surfaces within a structure opening when mounted to hold said foam sheet in place; and, wherein said protective mesh sheet engages said interior wall surfaces when said flexible polymer foam sheet is compressed in said structure opening so that said protective mesh sheet stabilizes and supports said flexible polymer foam sheet within said structure opening.

In a further advantageous embodiment, said at least one securing member includes a first portion anchored in said foam sheet and a second portion engaging said protective mesh sheet, wherein said second portion engages at least one wire of said protective mesh sheet such that said protective mesh sheet is movable in both horizontal and vertical directions.

BRIEF DESCRIPTION OF THE DRAWINGS

The system designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 shows a rear view of the rodent protection insert with the removable plugs installed in the airflow port according to the present invention;

FIG. 3 shows a detailed front view of a portion of the rodent protection insert according to the present invention;

FIG. 4 shows a perspective view of a securing member of the rodent protection insert according to the present invention;

Figure 1:
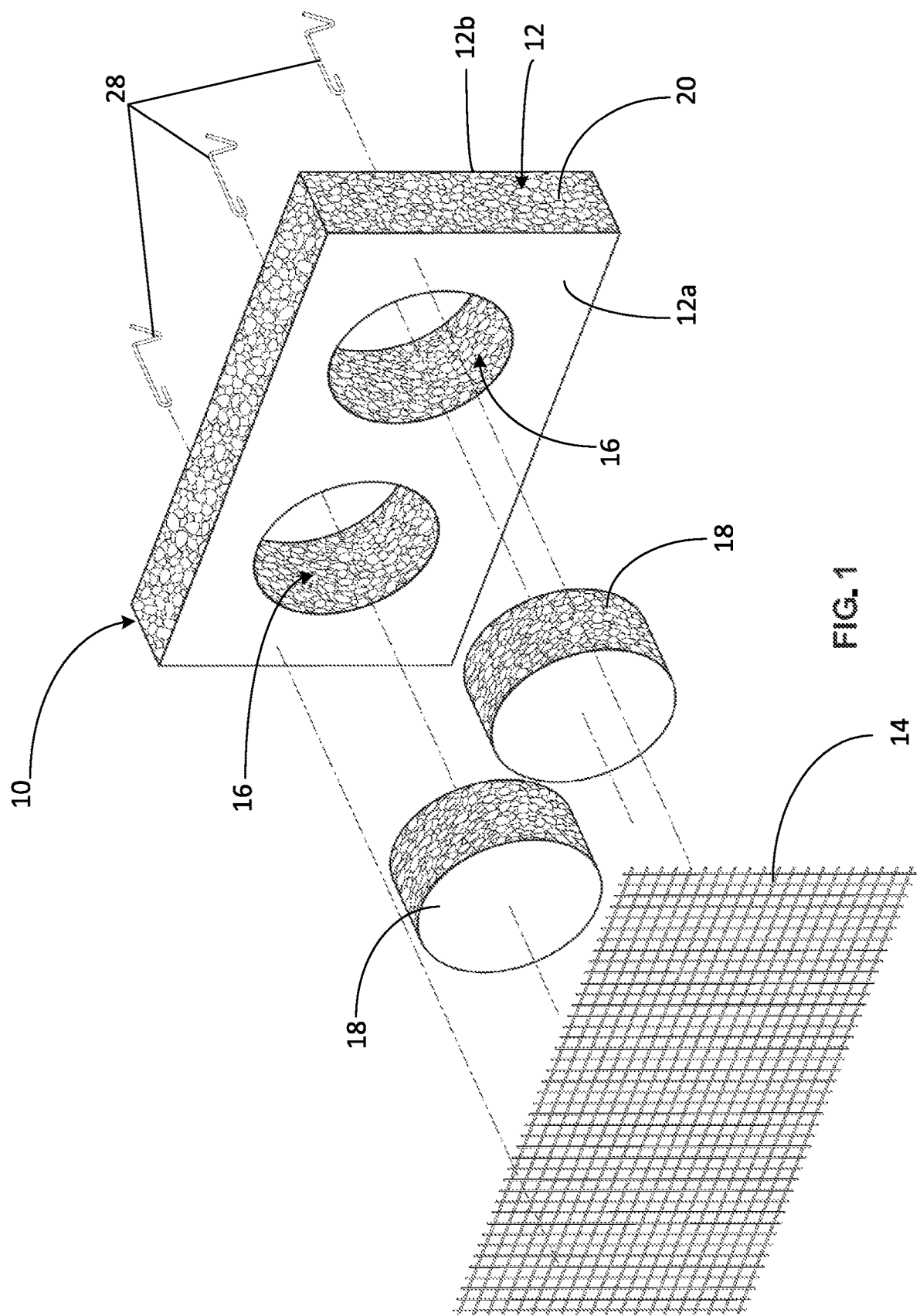
FIG. 1 shows an exploded front perspective view of a rodent protection insert according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As shown in FIGS. 1-10, example embodiments are shown of a rodent protection insert, designated generally as 10, for use in a structure opening such as a vent opening in a crawl space or basement. The rodent protection insert 10 conforms to the structure opening walls to hold the rodent protection insert in place and form an airtight seal to control airflow through the structure opening without the need for mechanical fasteners. As shown and described herein, the rodent protection insert 10 is adaptable to provide a combination of sealing, insulation and ventilation as needed for a given space. Further, the rodent protection insert 10 includes protection against rodent intrusion and damage, and even insect intrusion. The insert can be used in basically any opening in the structure and is not limited to use in vent openings. Rather, it can be used to seal and control airflow and prevent rodent intrusion in attics, basements, crawl spaces, walls, ceilings, floors, doors, windows, roofs, and anywhere else an opening in the structure needs to be filled to control airflow and prevent rodent and insect intrusion. The rodent protection insert 10 of the present invention can be installed without the need to remove any existing vent covers or wire mesh that may have previously been installed, saving significant time and money while providing all the requirements for insulation, ventilation and rodent protection. Additionally, the rodent protection insert 10 is operable as a flood vent for structure openings in crawl spaces and basements. Because the rodent protection insert 10 does not use any mechanical fasteners to hold it in place, when water pressure in a flood situation reaches a certain point, the rodent protection insert 10 simply pops out of place and allows water to flow through the vent opening in the structure foundation.

Figure 10:
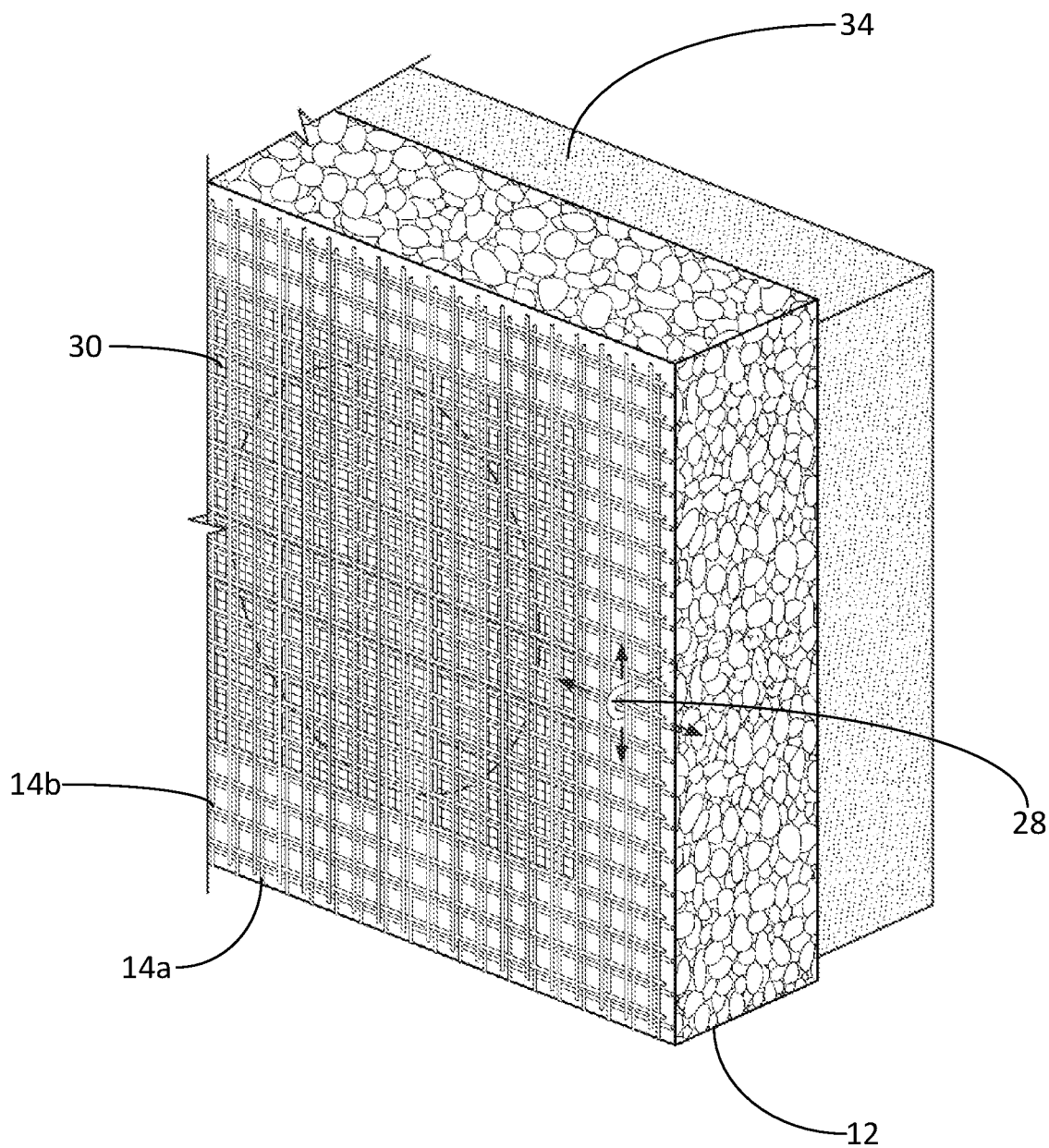

Referring to FIGS. 1 and 2, in an illustrated embodiment, rodent protection insert 10 includes a flexible polymer foam sheet 12 with at least one protective mesh sheet 14 carried on a front side 12a of the flexible polymer foam sheet 12. In the preferred embodiment, at least one airflow port 16 is disposed in the flexible polymer foam sheet 12 with a removable plug 18 disposed in the airflow opening 16 for controlling airflow through the airflow port 16. The protective mesh sheet(s) are movably carried on front side 12a of flexible polymer foam sheet 12 to allow for adjustment during installation in a structure opening when engage the walls of the structure opening together with the flexible polymer foam sheet to hold the rodent protection insert 10 in position. To secure the protective mesh sheet(s) 14 to the flexible polymer foam sheet 12, at least one securing member 28 is provided having a first portion anchored in the foam sheet 12 and a second portion engaging at least one protective mesh sheet. The second portion loops over at least one wire of the at least one protective mesh sheet 14 such that the at least one protective mesh sheet 14 is movable in both horizontal and vertical directions (FIG. 10). Accordingly, the at least one protective mesh sheet 14 is mechanically connected to and adjustable relative to the front side 12*a* of flexible polymer foam sheet 12.

Figure 7:
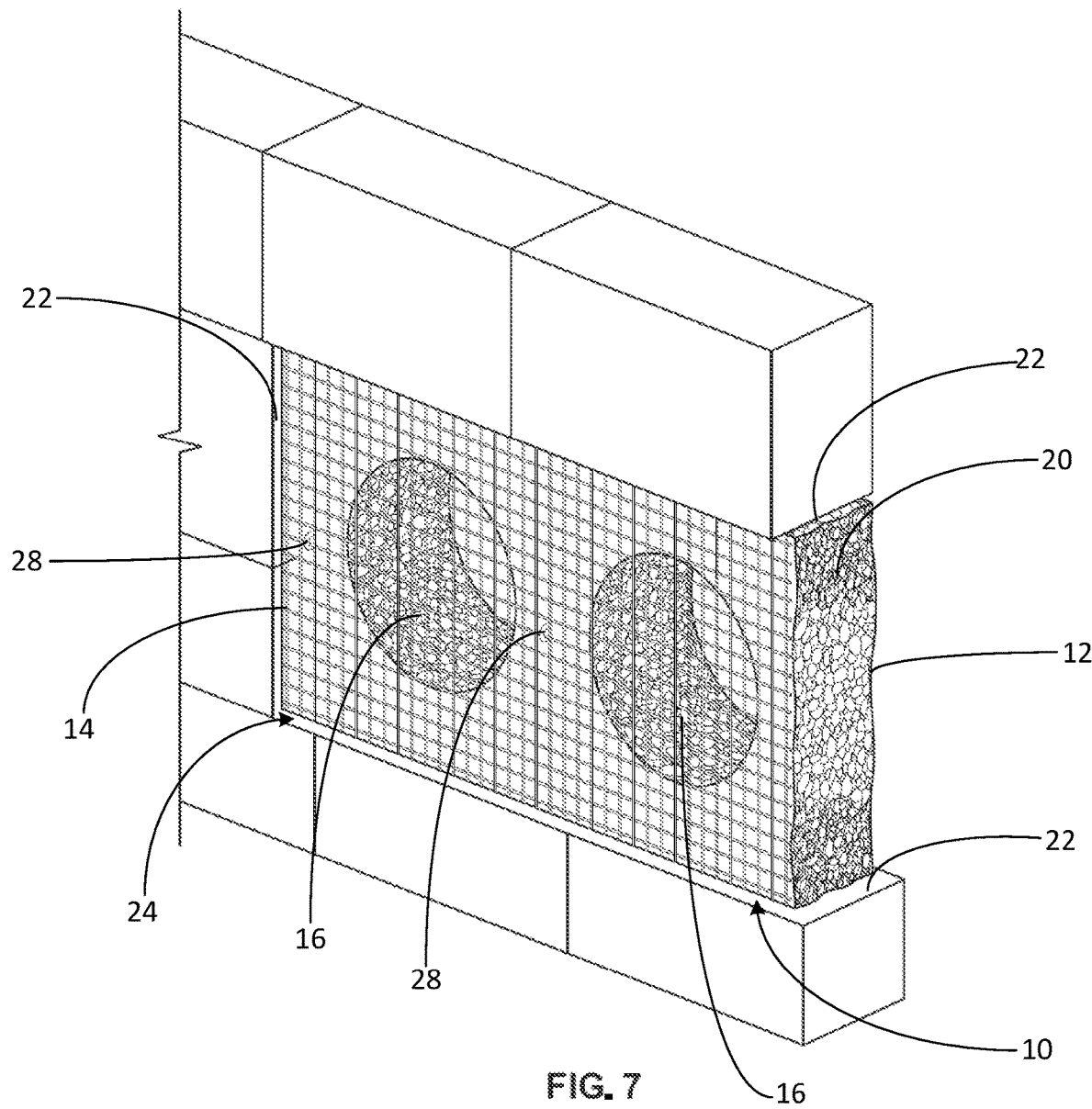
FIG. 7 show a front perspective cut-away view of the rodent protection insert mounted in a structure opening according to the present invention.

Referring to FIG. 7, a perimeter edge surface 20 of the flexible polymer foam sheet 12 compresses against and conforms to interior wall surfaces 22 within a structure opening, designated generally as 24. Accordingly, when mounted or otherwise installed in a structure opening 24, which in the illustrated embodiment is a crawl space vent opening, flexible polymer foam sheet 12 forms an airtight seal against the interior wall surfaces 22 and firmly hold the foam sheet 12 in place with a friction fit arrangement. In a preferred embodiment, flexible polymer foam sheet 12 comprises a polyethylene foam sheet. Polyethylene foam is flexible, trimmable to custom fit to any non-standard size opening, waterproof, and UV resistant. Other flexible types of polymer foam sheets are also contemplated within the scope of the present invention so long as they are able to conform to and form an airtight seal against the walls of the structure opening. Suitable materials for the flexible polymer foam sheet can include polypropylene, polystyrene, polyvinyl chloride (PVC), poly(methyl methacrylate) (PMMA), epoxy resin, phenolic resin, polyester, polyurethane, and combinations thereof, so long as the material is constructed and arranged to be flexible, compressible and conforming in nature.

As noted above, an issue with installing inserts into common structure openings involves various imperfections in the structure openings, for example, excess mortar that interferes with fitment, construction variances in size and shape, human error, or even sealing an opening that was the result of damage or other unintended gaps for which no other insert was designed or intended to fill. The flexible polymer foam sheet 12 allows for mounting in rough and irregular shaped openings by compressing and conforming to imperfections in the interior wall surfaces 22 of the structure opening 24 to form an airtight seal against the walls defining the structure opening 24. Thus, no screws or drilling are needed to mount the rodent protection insert of the present invention in the structure opening 24. The flexible polymer foam sheet 12 has sufficient friction engagement to hold the rodent protection insert 10 in place in the structure opening 24. Thus, foam sheet 12 is squeezed into and seals against the interior surface of the structure. Accordingly, foam sheet 12 provides many benefits including an insulation layer that forms an airtight mounting within the structure opening, installs easily without the need to drill holes for screws or other types of mechanical fasteners, is waterproof, UV resistant, can easily be trimmed for odd sizes, and does not crack or break like other rigid insulation foams. This design helps contractors reduce labor installation time.

Additionally, the at least one protective mesh sheet 14 is smaller than front side 12*a* of flexible polymer foam sheet 12. The protective mesh sheet 14 thus engages interior wall surfaces 22 when perimeter surface 20 of flexible polymer foam sheet 12 is compressed in the structure opening 24 so that the protective mesh sheet 14 stabilizes and supports flexible polymer foam sheet 12 within structure opening 24. Further, the protective mesh sheets 14 can be folded over the foam sheet 12 to further conform to a given space. The foam sheet 12 will seal around the folded over mesh sheet 14 and still form an airtight seal against the wall surface 22 of the structure opening 24. Also, the protective mesh sheet 14 can be trimmed to confirm to a given structure opening.

In one arrangement, an adhesive or other sealing or bonding material can be applied to perimeter surface 20 around the perimeter of foam sheet 12 for further sealing and bonding of the flexible polymer foam sheet 12 to the interior wall surfaces 22 of structure opening 24. To apply the adhesive, the flexible polymer foam sheet 12 is first installed in the structure opening, and then a nozzle from the adhesive dispenser is inserted between the foam sheet 12 and wall surfaces 22 and moved around perimeter edge 20 to apply the adhesive or other sealant. The perimeter edge 20 deforms as the nozzle is inserted and moved across a given area. The perimeter edge 20 of foam sheet 12 then recompress against the interior wall surfaces 22 after the adhesive is applied and the nozzle removed. The adhesive preferably maintains at least 25% flexibility to allow for expansion and contraction. However, the use of adhesive is optional for a more permanent installation, but not required to hold the rodent protection insert 10 in position.

Figure 5:
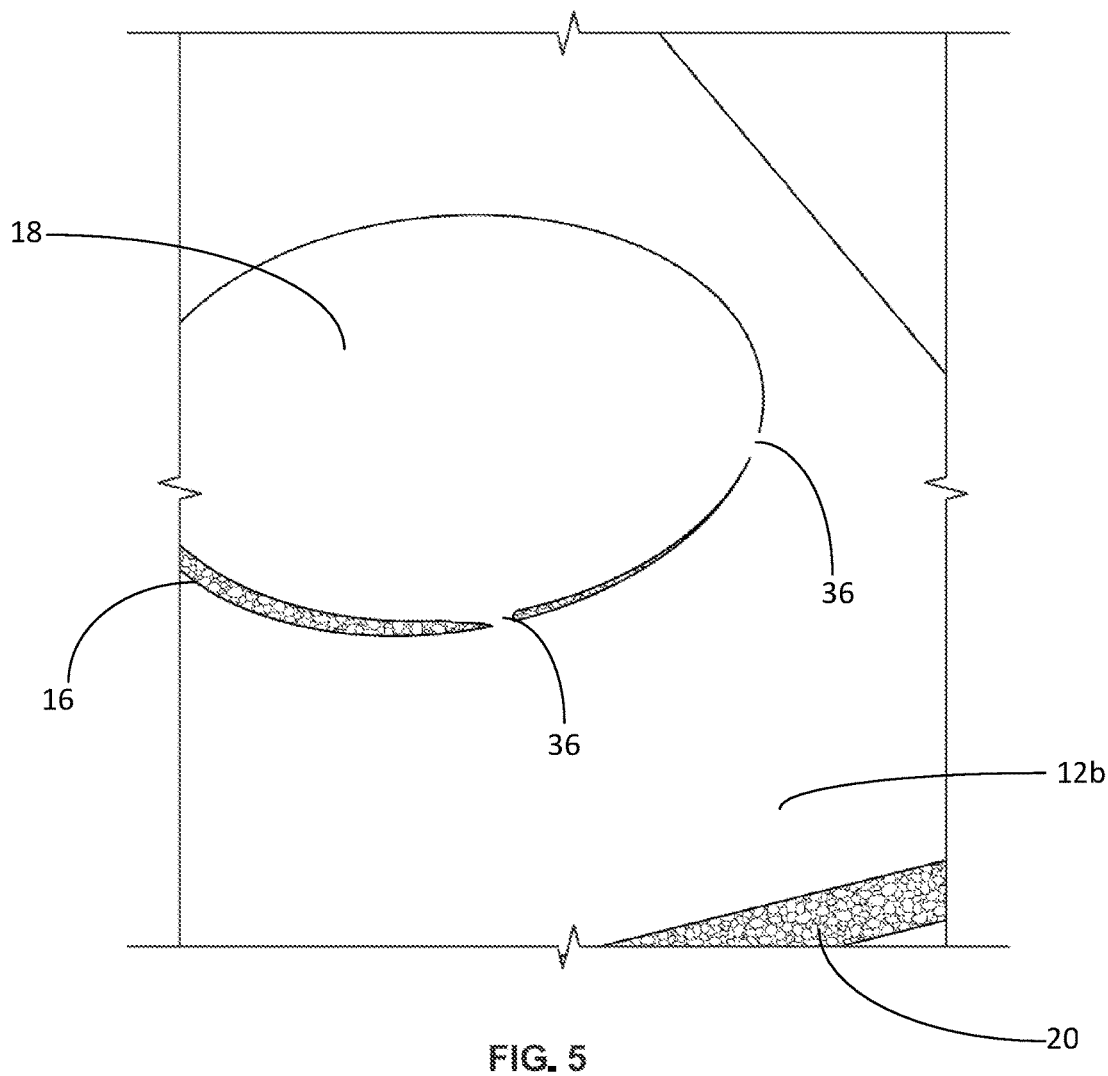
FIG. 5 shows a rear perspective view of the removable plugs and a connecting member according to the present invention.
Figure 6:
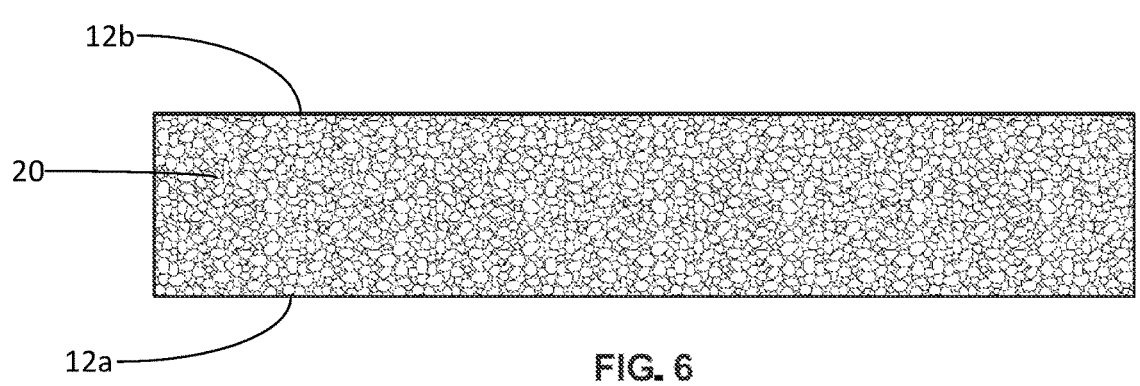
FIG. 6 shows a side view of a perimeter edge of the flexible polymer foam sheet having exposed open cells according to the present invention.

In a preferred embodiment, flexible polymer foam sheet 12 is a polyethylene foam having a closed cell structure on the front surface 12*a* (see FIG. 1) and the rear surface 12*b* (see FIGS. 2 and 5), and an exposed open cell structure around perimeter edge 20 (see FIGS. 1 and 6). This allows the adhesive to penetrate deeper into the perimeter surface 20 for sealing and bonding foam sheet 12 to the walls 22 of the structure opening 24, as shown in FIG. 7. Accordingly, flexible foam sheet 12 forms a tight seal to prevent air from leaking around the sides of the rodent protection insert 10 to prevent unwanted airflow leaking into or out of the associated structure opening.

The protective mesh sheet 14 flexes with the flexible polymer foam sheet 12 as needed during installation without detaching from the flexible polymer foam sheet 12 when mounting in the structure opening 24 to facilitate conforming and sealing the flexible polymer foam sheet 12 within the structure opening 24. In a preferred embodiment, flexible polymer foam sheet 12 is slightly bigger than protective mesh sheet 12 so that when foams sheet 12 is compressed against interior wall surfaces 22, it allows the mesh sheet 14 to locate adjacent the interior wall surfaces 22 without interfering in the engagement and compression of foam sheet 12 in structure opening 24.

Referring to FIGS. 1-4, to prevent separation of the protective mesh sheet 14 from foam sheet 12 when flexing, at least one securing member 28 is used. In the illustrated embodiment, a series of securing members 28 are inserted into the rear surface 12*b* of flexible polymer foam sheet 12 and extend through and outward from front surface 12*a*. Securing members 28 engage with the protective mesh sheet 14 in a movable arrangement to provide a mechanical connection between the mesh sheet 14 and foam sheet 12 to prevent separation. In the illustrated embodiment, securing member 28 includes a first portion and a second portion. As best shown in FIG. 2, the first portion includes a generally V-shaped end section 28*a* that extends parallel along a rear surface 12*b* of flexible polymer foam sheet 12 when mounted in foam sheet 12. The first portion also includes a shaft 28*b* extending through flexible polymer foam sheet 12 to a front surface 12*a*. The second portion of securing member 28 includes a hook 28*c* looping over at least one wire of the at least one protective mesh sheet 14. As shown in FIG. 10, the strands of the protective mesh sheets 14*a* and 14*b* are arranged within hook 28*c* to be movable in both horizontal and vertical directions to provide adjust during installation in a structure opening which maintaining a mechanical connection to form sheet 12.

In the illustrated embodiment, securing members 28 are attached between airflow ports 16 and perimeter edge 20, and between both of airflow ports 16 along a straight line across the center of foam sheet 12. The securing members 28 eliminates any wrinkles and separation of protective mesh sheet 14 and foam sheet 12 when flexing during installation. The protective mesh sheet 14 when secured to foam sheet 12 helps to stabilize the rodent protection insert 10 in the structure opening 24 against wind or animal dislodging without the specific need for additional seals or mechanical securing members. While additional sealant or adhesive can be included around perimeter surface 20 for a more permanent installation as noted above, it is not required. The protective mesh sheet 14 flexes with the flexible polymer foam sheet 12 without detaching from the flexible polymer foam sheet when mounting in the structure opening 24 to facilitate conforming and sealing the flexible polymer foam sheet 12 within the structure opening 24.

Figure 8:
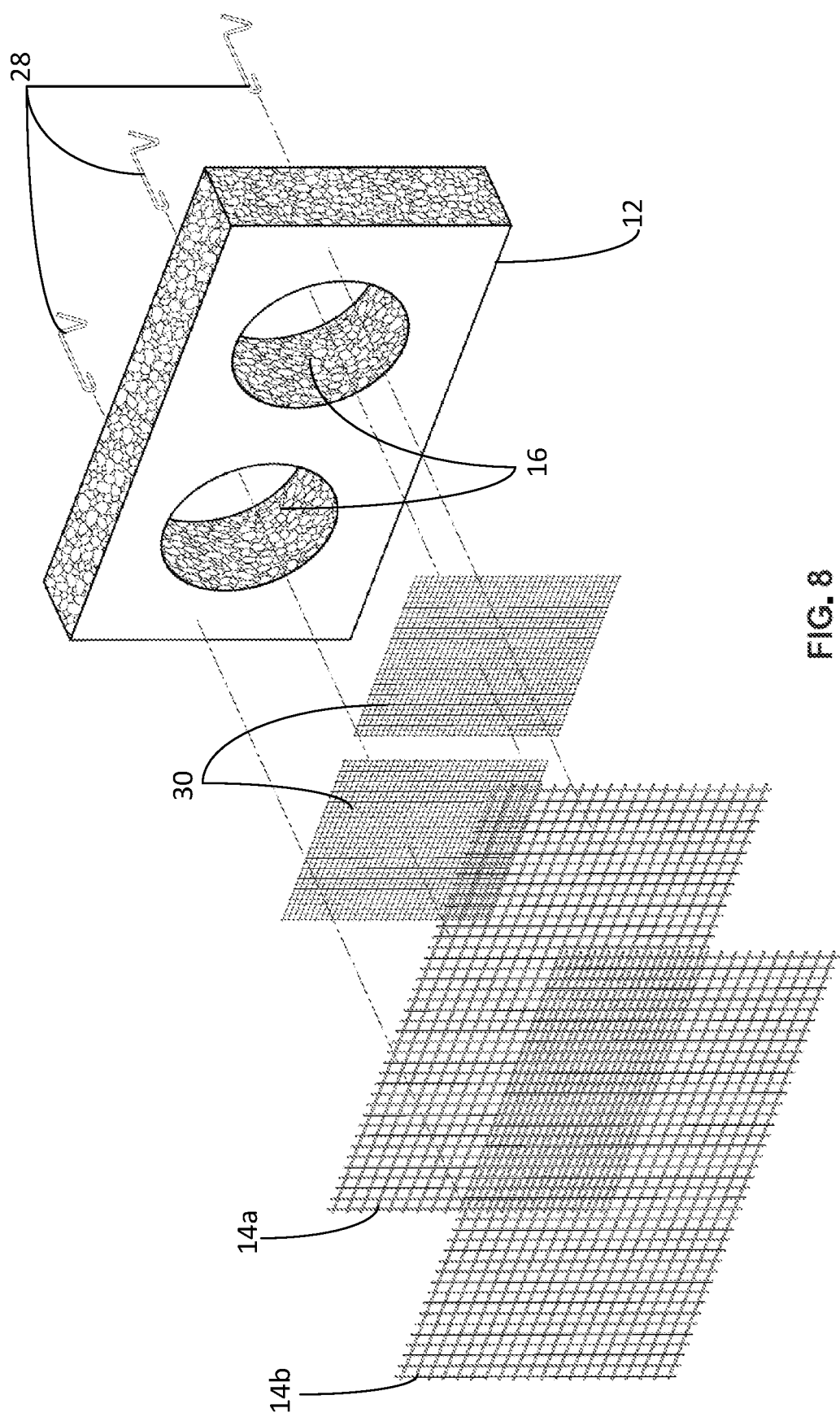
FIG. 8 shows an exploded front perspective view with multiple mesh sheets and an insect screen disposed over the airflow ports of the rodent protection insert according to the present invention.
Figure 9:
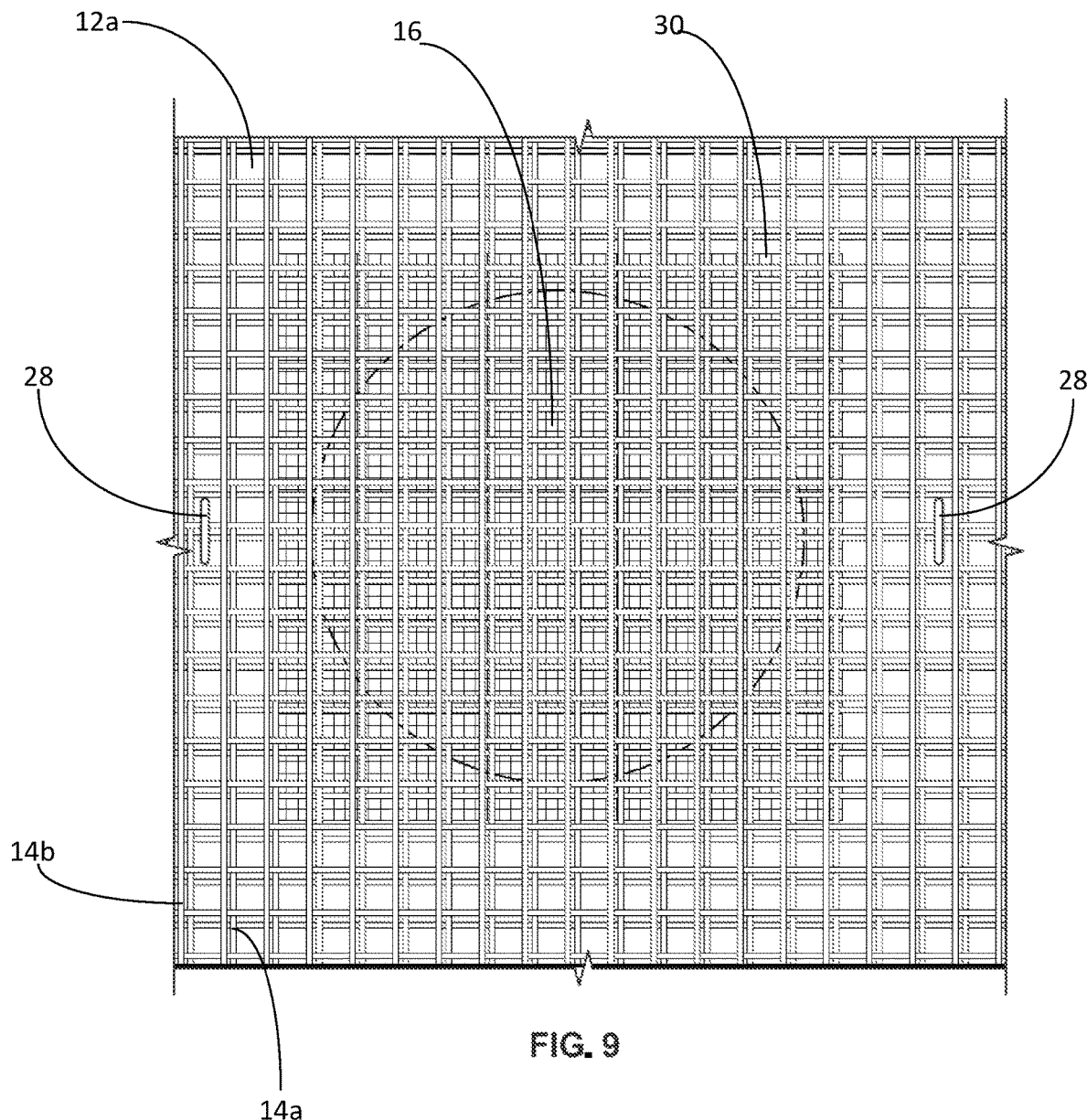
FIG. 9 shows a detailed front view of a portion of the rodent protection insert according to the present invention; and, FIG. 10 shows a front perspective view of the rodent protection insert including an insulation block carried on a rear side according to the present invention.

Referring to FIGS. 3, 8, 9 and 10, the use of securing members 28 allows for the stacking and securing of multiple layers of protective mesh sheet 14, particularly for commercial applications where additional rodent protection is needed. In the illustrated embodiments, a first protective mesh sheet layer 14a is secured to front surface 12a of foam sheet 12. A second protective mesh sheet layer 14b is then disposed on top of first protective mesh sheet layer 14a. The additional layer of mesh sheet 14b could be a larger mesh than first mesh sheet 14a. If the same size mesh is used for both sheets, it is desirable to off-set the mesh sheets 14a and 14b so that mesh does not line up, as best shown in FIG. 9. This arrangement further frustrates rodents that may attempt to chew threw the mesh. The mesh sheets 14a and 14b preferably comprise metal, or other durable rodent resistant mesh material. In one embodiment, protective mesh sheets 14a and 14b are preferably comprised of stainless steel. Mesh sheets 14a and 14b may also have a different thickness gauge such that mesh sheet 14b has a thicker gauge mesh sheet than mesh sheet 14a.

Referring to FIG. 8, in one embodiment, the rodent protection insert 10 includes an insect screen 30 carried on front side 12a of flexible polymer foam sheet 12 covering over the airflow port 16. Insect screen 30 is disposed between the protective mesh sheet 14 and the flexible polymer foam sheet 12. Insect screen 30 is intended to deter smaller critters, insects, and debris. This removable fine mesh insect screen 30, slides in from a top edge between the foam sheet 12 and mesh sheet 14. Insect screen 30 can be removed to meet airflow code requirements as needed since the finer mesh screen can restrict airflow. Optionally, when using insect screen 30, airflow openings 16 may be increased or made larger to compensate for restricted airflow. Insect screen 30 can be made of any suitable material such as fiberglass, metal wire, plastic etc.

Referring to FIG. 2, in the illustrated embodiment, the V-shaped end section 28a of the first portion of securing members 28 also function as a guide prong to assist with positioning rodent protection insert 10 in structure opening 24. A user's finger can be inserted under the V-shaped end section 28a to grab for manipulating the position of foam sheet 12 in a structure opening 24. Thus, in addition to resisting securing member 28 for pulling through foam sheet 12, V-shaped end section 28a provide a grab point to help control and hold rodent protection insert 10 while adjusting and fine tuning the position in structure opening 24.

Referring to FIG. 1, airflow port 16 comprises a 5¼" opening formed in foam sheet 12. Smaller structure openings may require a rodent protection insert 10 with only one airflow port 16 while larger structure openings may require a rodent protection insert 10 with multiple airflow ports 16 that may be of various sizes. For example, a standard structure opening 24 such a vent in a crawl space is intended to be 8"×16" but every crawl space and basement vent opening can be different. The typical 8"×16" will require two 5¼" opening with removable plugs 18, as shown in the illustrated example embodiment. A 16"×16" opening could use four openings; the size and number of openings is determined by various building codes. Regardless of the size of airflow port(s) 16, it is important to leave a minimum of 1" of foam sheet 12 material between the edge of the airflow port 16 and perimeter surface 20 to allow for compression of foam sheet 12 in structure opening 24 and to provide space on front surface 12a for securing mesh sheet 14 with securing members 28. Removable plugs 18 disposed in airflow ports 16 are squeezed when foam sheet 12 is compressed in structure opening 24 to help hold removable plugs 18 in place and form an airtight seal with the rest of foam sheet 12.

To form the airflow ports 16 in foam sheet 12 and removable plugs 18, the foam sheet must be cut without removing material so that removable plugs 18 form a tight fit in airflow ports 16. To do so, foam sheet 12 must first be compressed and then cut so it does not remove product and then removable plugs fit tight. This is done by making a round cutter without teeth that is plunged into the foam sheet 12 which cuts the airflow port 16 and creates the removable plug 18. Removable plugs 18 are typically used for sealed crawl space environments or used in winter months, in some climates, to reduce airflow and temperature in the crawl space vent opening. Removable plugs 18 can then be removed in the summer to allow greater airflow circulation. The rodent protection insert 10 is also a solution for converting a crawl space from vented to an encapsulated space just by inserting the removable plugs 18 in airflow ports 16. Accordingly, rodent protection insert 10 can be used on all applications, whether sealed, vented and both while also providing a high degree of rodent and insect intrusion protection. Referring to FIG. 5, in the illustrated embodiment, removable plugs 18 includes at least one connecting member 36 securing the removable plug 18 to the flexible polymer foam sheet 12. Connecting member 36 is integral with flexible polymer foam sheet 12 and removable plug 18. The connecting member 36 can be severed to allow removable plugs 18 to be removed from a given airflow port 16. Accordingly, connecting member 36 ensures removable plug 18 is not accidentally removed or falls out.

An option to meet regional codes for sealed crawl spaces is to have additional R value insulation on rodent protection inserts 10. This is accomplished by attaching an additional insulation backing layer 34 on the rear side 12b of flexible polymer foam sheet 12. In one embodiment, insulation backing layer 34 comprises a traditional foam block insulation piece added to the rodent protection insert 10, for example, a 7⅞"×15⅞" insulation block. This block may also have a borate additive to discourage termite activity. In one embodiment, the insulation block is attached using a hot melt adhesive or the like on rear surface 12b of foam sheet 12.

This product eliminates the need to cut wire on site and drill and screw to install rodent protection in a structure opening. It saves over 90% of labor time to install open or sealed crawl space vent openings inserts for rodent protection. This rodent protection insert 10 can be used for sealing, venting and new rodent protection or replacing damaged openings in basements and crawl spaces, or any other opening in a structure. This multi-use rodent protection insert 10 compresses and seals against the structure opening walls, can be easily trimmed to fit odd sized opening, and removable plugs 18 are held in place in an airtight arrangement or removed to allow for increased airflow as desired for a given application. Accordingly, the rodent protection insert 10 can be used for sealed and encapsulated space application with rodent protection, or for vented rodent resistant insert applications. In either case, the rodent protection insert 10 of the present invention can be used without replacing existing vent covers or rodent protection inserts such as wire mesh that is already in place. Rather, the rodent protection insert 10 can be inserted behind such prior existing covers or rodent protection in the same structure opening. The rodent protection insert 10 can be adapted to provide several options for protective mesh sheet arrangements, including layering sheets for commercial applications. The rodent protection insert 10 is easily adaptable to various structure opening sizes and can further be easily cut or trimmed on site to custom fit any opening. The protective mesh sheets 14 can also be trimmed or folded over the foam to adjust to a given size opening while still allowing the foam sheet 12 to conform to the wall surface and form an airtight engagement. The rodent protection insert 10 is also dual use as being vented when the removable plugs 18 are removed, such as during summer months to increase airflow, and sealed when removable plugs 18 are placed in airflow ports 16, such as during winter months to seal a vent opening, while also providing rodent protection for all uses.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A rodent protection insert for a structure opening comprising:
    a flexible polymer foam sheet;
    at least one airflow port disposed in said flexible polymer foam sheet;
    a removable plug disposed in at least one said airflow port for controlling airflow through said airflow port;
    at least one protective mesh sheet movably carried on a front side of said flexible polymer foam sheet;
    at least one securing member having a first portion anchored in said foam sheet and a second portion engaging said at least one protective mesh sheet, wherein said second portion loops over at least one wire of said at least one protective mesh sheet such that said at least one protective mesh sheet is movable in both horizontal and vertical directions;
    whereby said at least one protective mesh sheet is mechanically connected to and adjustable relative to said front side of said flexible polymer foam sheet.

2. The rodent protection insert of claim 1 wherein said at least one protective mesh sheet includes a first protective mesh sheet adjacent said front side of said flexible polymer foam sheet, and a second protective mesh sheet carried on said first protective mesh sheet so that said first protective mesh sheet is disposed between said front side of said flexible polymer foam sheet and said second protective mesh sheet.

3. The rodent protection insert of claim 2 wherein said first and second protective mesh sheets have a staggered layered arrangement so that vertical and horizontal strands of the protective mesh sheet do not align.

4. The rodent protection insert of claim 2 wherein at least one of said first and second protective mesh sheets comprises a metal wire mesh.

5. The rodent protection insert of claim 1 including an insect screen carried on a front side of said flexible polymer foam sheet covering over said at least one airflow port, wherein said insect screen is disposed between said at least one protective mesh sheet and said flexible polymer foam sheet.

6. The rodent protection insert of claim 1 wherein said flexible polymer foam sheet is selected from the group consisting of polyethylene, polypropylene, polystyrene, polyvinyl chloride (PVC), poly(methyl methacrylate) (PMMA), epoxy resin, phenolic resin, polyester, polyurethane, and combinations thereof.

7. The rodent protection insert of claim 1 wherein said flexible polymer foam sheet comprises a polyethylene foam having a closed cell structure on a front surface and a rear surface, and an open cell structure around a perimeter surface.

8. The rodent protection insert of claim 1 including an insulation backing layer carried on a rear side of said flexible polymer foam sheet.

9. The rodent protection insert of claim 1 wherein said first portion of said at least one securing member includes a generally V-shaped end section extending parallel along a rear surface of said flexible polymer foam sheet and a shaft extending through said flexible polymer foam sheet to a front surface.

10. The rodent protection insert of claim 9 wherein said second portion of said at least one securing member includes a hook looping over at least one wire of said at least one protective mesh sheet.

11. The rodent protection insert of claim 1 wherein said removable plug includes a connecting member securing said removable plug to said flexible polymer foam sheet, wherein said connecting member is integral with said flexible polymer foam sheet and said removable plug, and wherein said connecting member is severed to allow said plug to be removed from said airflow port.

12. The rodent protection insert of claim 11 wherein said flexible polymer foam sheet is compressed against said removable plug in said airflow port to form an airtight seal between said removable plug and said flexible polymer foam sheet.

13. The rodent protection insert of claim 1 wherein said flexible polymer foam sheet includes a compressible perimeter surface that compresses against and conforms to interior wall surfaces within a structure opening when mounted to hold said foam sheet in position and form an airtight seal against said interior wall surfaces.

14. The rodent protection insert of claim 13 wherein said at least one protective mesh sheet is smaller than said front side of said flexible polymer foam sheet, and wherein said protective mesh sheet engages said interior wall surfaces when said perimeter surface of said flexible polymer foam sheet is compressed in said structure opening so that said protective mesh sheet stabilizes and supports said flexible polymer foam sheet within said structure opening.

15. A rodent protection insert for a structure opening comprising:
- a flexible polymer foam sheet,
- a protective mesh sheet carried on a front side of said flexible polymer foam sheet which moves independently on said front side of said flexible polymer foam sheet;
- at least one securing member maintaining a mechanical connection between said flexible polymer foam sheet and said protective mesh sheet;
- an airflow port disposed in said flexible polymer foam sheet;
- a removable plug disposed in said airflow port for controlling airflow through said airflow port;
- wherein a perimeter edge of said flexible polymer foam sheet compresses against and conforms to interior wall surfaces within a structure opening when mounted to form an airtight seal against said interior wall surfaces and hold said foam sheet in place; and,
- wherein said protective mesh sheet engages said interior wall surfaces when said flexible polymer foam sheet is compressed in said structure opening so that said protective mesh sheet stabilizes and supports said flexible polymer foam sheet within said structure opening.

16. The rodent protection insert of claim 15 including an insect screen carried on said front side of said flexible polymer foam sheet covering over said airflow port, wherein said insect screen is disposed between said protective mesh sheet and said flexible polymer foam sheet.

17. The rodent protection insert of claim 15 wherein said at least one securing member includes a first portion having a generally V-shaped end section extending parallel along a rear surface of said flexible polymer foam sheet and a shaft extending through said flexible polymer foam sheet to a front surface.

18. The rodent protection insert of claim 17 wherein said at least one securing member includes a second portion having a hook looping over at least one wire of said protective mesh sheet so that said protective mesh sheet is movable relative to said front side of said flexible polymer foam sheet.

* * * * *